(12) United States Patent
Mao et al.

(10) Patent No.: US 12,197,470 B2
(45) Date of Patent: Jan. 14, 2025

(54) SHARD ADJUSTMENT METHOD, APPARATUS, AND DEVICE FOR TIME SERIES DATABASE, AND READABLE STORAGE MEDIUM

(71) Applicant: Huawei Cloud Computing Technologies Co., Ltd., Guizhou (CN)

(72) Inventors: Jingqi Mao, Chengdu (CN); Ran Xu, Chengdu (CN); Zongquan Zhang, Gui'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/405,617

(22) Filed: Jan. 5, 2024

(65) Prior Publication Data
US 2024/0143626 A1    May 2, 2024

Related U.S. Application Data

(63) Continuation of application No. PCT/CN2022/087412, filed on Apr. 18, 2022.

(30) Foreign Application Priority Data

Jul. 8, 2021   (CN) .......................... 202110770891.9
Oct. 30, 2021   (CN) .......................... 202111278133.1

(51) Int. Cl.
*G06F 16/2458* (2019.01)
*G06F 16/27* (2019.01)

(52) U.S. Cl.
CPC ........ *G06F 16/278* (2019.01); *G06F 16/2477* (2019.01)

(58) Field of Classification Search
CPC .......................... G06F 16/278; G06F 16/2477
See application file for complete search history.

(56) References Cited

U.S. PATENT DOCUMENTS

| | | | |
|---|---|---|---|
| 8,195,665 B1 * | 6/2012 | Mayle | G06F 16/285 707/973 |
| 10,769,126 B1 * | 9/2020 | Hagerup | G06F 16/2453 |
| 10,884,644 B2 * | 1/2021 | Rath | G06F 16/907 |
| 10,997,137 B1 * | 5/2021 | Goyal | G06F 16/24573 |
| 11,841,864 B2 * | 12/2023 | Su | G06F 3/061 |
| 2017/0103092 A1 * | 4/2017 | Hu | G06F 16/2471 |

* cited by examiner

*Primary Examiner* — Jorge A Casanova
(74) *Attorney, Agent, or Firm* — Conley Rose, P.C.

(57) ABSTRACT

In a shard adjustment method for a time series database, feature information of an access request of at least one user for a data table of a time series database is obtained. The data table is divided into a plurality of shard groups according to a predetermined rule, and each shard group can be further divided into a plurality of shards. Each shard group is set in a different time period, and each shard is set in a different node. Then, the predetermined rule is adjusted based on the feature information, and a new shard group and/or a new shard that match/matches the access habit are/is generated according to an adjusted rule.

20 Claims, 7 Drawing Sheets

---

Obtain feature information of an access request of at least one user for a data table of a time series database, where the feature information is used to reflect an access habit of the at least one user for the data table — 201

Adjust a predetermined rule based on the feature information, and generate, according to an adjusted rule, a new shard group and/or a new shard that match/matches the access habit — 202

| Sequence number | Timestamp | Device identifier | CPU average per minute | Free memory | Temperature | Location identifier | Development type |
|---|---|---|---|---|---|---|---|
| Time series data 1 | 2017-01-01 01:02:00 | abc123 | 80 | 500 M | 72 | 42 | Type 1 |
| Time series data 2 | 2017-01-01 01:02:23 | def456 | 90 | 400 M | 64 | 42 | Type 2 |
| Time series data 3 | 2017-01-01 01:02:30 | ghi789 | 120 | 0 M | 56 | 77 | Type 2 |
| Time series data 4 | 2017-01-01 01:03:12 | abc123 | 80 | 500 M | 72 | 42 | Type 1 |
| Time series data 5 | 2017-01-01 01:03:35 | def456 | 95 | 350 M | 64 | 42 | Type 2 |
| Time series data 6 | 2017-01-01 01:03:42 | ghi789 | 100 | 100 M | 46 | 77 | Type 2 |

FIG. 3

| Sequence number | Timestamp | Device identifier | CPU average per minute | Free memory | Temperature | Location identifier | Development type |
|---|---|---|---|---|---|---|---|
| Time series data 1 | 2017-01-01 01:02:00 | abc123 | 80 | 500 M | 72 | 42 | Type 1 |
| Time series data 2 | 2017-01-01 01:02:23 | def456 | 90 | 400 M | 64 | 42 | Type 2 |
| Time series data 3 | 2017-01-01 01:02:30 | ghi789 | 120 | 0 M | 56 | 77 | Type 2 |
| Time series data 4 | 2017-01-01 01:03:12 | abc123 | 80 | 500 M | 72 | 42 | Type 1 |
| Time series data 5 | 2017-01-01 01:03:35 | def456 | 95 | 350 M | 64 | 42 | Type 2 |
| Time series data 6 | 2017-01-01 01:03:42 | ghi789 | 100 | 100 M | 46 | 77 | Type 2 |

SHARD ADJUSTMENT METHOD, APPARATUS, AND DEVICE FOR TIME SERIES DATABASE, AND READABLE STORAGE MEDIUM

CROSS-REFERENCE TO RELATED APPLICATIONS

This is a continuation of Int'l Patent App. No. PCT/CN2022/087412, filed on Apr. 18, 2022, which claims priority to Chinese Patent App. No. 202110770891.9, filed on Jul. 8, 2021, and Chinese Patent App. No. 202111278133.1, filed on Oct. 30, 2021, all of which are incorporated by reference.

FIELD

This disclosure relates to the field of data processing technologies, and in particular, to a shard adjustment method, apparatus, and device for a time series database, and a readable storage medium.

BACKGROUND

In a time series database, data is stored in a form of a data table. Due to a growing data volume, the time series database needs to distribute the data table to a plurality of nodes for storage. Therefore, sharding needs to be performed on the data table to form a plurality of shards, so that the shards are separately set in different nodes.

In a conventional technology, the data table is first divided based on time periods to obtain a plurality of shard groups, and each shard group is set in a different time period. In a shard group, division is further performed according to a specific rule to obtain a plurality of shards, and each shard is set in a different node. The rule used to obtain the plurality of shards through division is a rule selected when the database or the data table is created.

However, with a change of a user service, an access habit of a user for the data table may change, and consequently the rule selected when the database or the data table is created does not match the access habit. If the selected rule is still used for sharding, exceptions such as load imbalance between nodes may occur, and consequently read/write performance of the nodes is affected.

SUMMARY

This disclosure provides a shard adjustment method, apparatus, and device for time series data, and a readable storage medium, to resolve a problem existing in a conventional technology. Technical solutions are as follows:

According to a first aspect, a shard adjustment method for a time series database is provided. First, feature information of an access request of at least one user for a data table of a time series database is obtained, where the feature information is used to reflect an access habit of the at least one user for the data table. The data table is divided into a plurality of shard groups according to a predetermined rule, and each shard group can be further divided into a plurality of shards. Each shard group is set in a different time period, and each shard is set in a different node. Then, the predetermined rule is adjusted based on the feature information, and a new shard group and/or a new shard that match/matches the access habit are/is generated according to an adjusted rule.

The feature information used to reflect the access habit of the user for the data table is obtained, and the predetermined rule is adjusted based on the feature information, so that the new shard group and/or the new shard that match/matches the access habit are/is generated according to the adjusted predetermined rule. A sharding rule can be updated in time, to avoid occurrence of an exception caused by an improper sharding rule, so that a shard group and/or a shard match/matches an access habit of a user, and read/write performance of nodes is ensured.

In a possible implementation, generating, according to the adjusted rule, the new shard group and/or the new shard that match/matches the access habit includes: generating the new shard group, and generating, in the new shard group according to the adjusted rule, the new shard that matches the access habit.

In a possible implementation, the method further includes: determining a reference moment in a predetermined shard group, where the predetermined shard group is a shard group in which an obtaining moment of the feature information is located, and the reference moment is a maximum moment at which data is written into the data table before the obtaining moment of the feature information; and determining a start moment of the new shard group based on a time interval between the reference moment and an end moment of the predetermined shard group. In this implementation, the reference moment is the maximum moment at which data is written into the data table. In this implementation, the reference moment is used as an earliest moment at which the predetermined rule can be adjusted, to avoid re-migration of data that has been written into the data table, and therefore avoid occupation of processing resources in a data migration process. Because the reference moment is the earliest moment at which the predetermined rule can be adjusted, in this implementation, the start moment of the new shard group is determined based on the reference moment.

In a possible implementation, the determining a start moment of the new shard group based on a time interval between the reference moment and an end moment of the predetermined shard group includes: in response to that the time interval is not less than a time threshold, determining the reference moment as the start moment of the new shard group. The method further includes: updating the predetermined shard group, where a start moment of an updated shard group is a start moment of the predetermined shard group, and an end moment of the updated shard group is the reference moment. Shard groups are generated in sequence. After a shard group ends, a next shard group is generated. "In response to that the time interval is greater than the time threshold" indicates that a time interval between the reference moment and a moment at which a next shard group is generated is long. If the predetermined rule is adjusted after the predetermined shard group ends, the predetermined rule needs to be used for a long time. Consequently, an exception may occur. Therefore, the predetermined rule needs to be updated as soon as possible. Based on this cause, in this implementation, the earliest moment at which the predetermined rule can be updated, namely, the reference moment, is determined as the start moment of the new shard group, so that the adjusted rule can be used in the new shard group. In this implementation, a process of determining the start moment of the new shard group is flexible.

In a possible implementation, an end moment of the new shard group is the end moment of the predetermined shard group. In this implementation, the end moment of the predetermined shard group is used as the end moment of the new shard group. In other words, the predetermined shard group is divided into two different shard groups by using the reference moment as a demarcation point. One of the shard groups is the updated shard group, and the other is the new shard group.

In a possible implementation, the determining a start moment of the new shard group based on a time interval between the reference moment and an end moment of the predetermined shard group includes: in response to that the time interval is less than a time threshold, determining the end moment of the predetermined shard group as the start moment of the new shard group. Shard groups are generated in sequence. After a shard group ends, a next shard group is generated. "In response to that the time interval is less than the time threshold" indicates that a time interval between the reference moment and a moment at which a next shard group is generated is short. Therefore, in this implementation, the predetermined rule may be adjusted when the next shard group is generated after the predetermined shard group ends, in other words, the end moment of the predetermined shard group is determined as the start moment of the new shard group. In this implementation, a process of determining the start moment of the new shard group is flexible.

In a possible implementation, the feature information includes a query fan-out degree, and the query fan-out degree indicates a quantity of nodes that need to be accessed to process the access request.

In a possible implementation, adjusting the predetermined rule based on the feature information includes: in response to that the quantity of nodes indicated by the query fan-out degree is greater than a quantity threshold, determining a sharding key based on a use frequency of an access condition obtained by parsing the access request, and adjusting the predetermined rule based on the sharding key to obtain the adjusted rule. The adjusted rule is obtained based on the sharding key, so that the query fan-out degree in an access process can be reduced.

In a possible implementation, obtaining the feature information of the access request of the at least one user for the data table of the time series database includes: parsing the access request to obtain the access condition, determining, based on the access condition, the node that needs to be accessed to process the access request, and determining the quantity of nodes that need to be accessed as the query fan-out degree.

In a possible implementation, the feature information includes a load imbalance degree, and the load imbalance degree indicates an imbalance degree of load of different nodes.

In a possible implementation, adjusting the predetermined rule based on the feature information includes: in response to that the imbalance degree indicated by the load imbalance degree is greater than a reference threshold, determining shard boundary values based on the load of the different nodes, and adjusting the predetermined rule based on the shard boundary values to obtain the adjusted rule. The adjusted rule is obtained based on the shard boundary values, so that load imbalance between nodes can be improved.

In a possible implementation, obtaining the feature information of the access request of the at least one user for the data table of the time series database includes: determining the load of the different nodes based on at least one of data volumes, quantities of timelines, and access frequencies of the timelines of the different nodes; and determining the load imbalance degree based on the load of the different nodes.

In a possible implementation, the feature information includes a correspondence between a user location and a node location, the user location is a location of the at least one user, and the node location is a location of a node that needs to be accessed to process the access request.

In a possible implementation, adjusting the predetermined rule based on the feature information includes: in response to that a distance between the user location and the node location in the correspondence between the user location and the node location is greater than a distance threshold, determining an updated node whose distance from the user location is not greater than the distance threshold, and adjusting the predetermined rule based on the updated node to obtain the adjusted rule. The adjusted rule is obtained based on the updated node, so that a data transmission distance in an access process can be reduced.

In a possible implementation, obtaining the feature information of the access request of the at least one user for the data table of the time series database includes: parsing the access request to obtain an access condition, determining, based on the access condition, the node that needs to be accessed to process the access request, and determining the correspondence between the user location and the node location based on the location of the node that needs to be accessed and the location of the at least one user.

In a possible implementation, the feature information includes at least one of the query fan-out degree, the load imbalance degree, and the correspondence between the user location and the node location.

According to a second aspect, a shard adjustment apparatus for a time series database is provided. The apparatus includes: an obtaining module configured to obtain feature information of an access request of at least one user for a data table of a time series database, where the data table is divided into a plurality of shard groups according to a predetermined rule, each shard group is divided into a plurality of shards, each shard group is set in a different time period, each shard is set in a different node, and the feature information is used to reflect an access habit of the at least one user for the data table; and an adjustment module configured to: adjust the predetermined rule based on the feature information, and generate, according to an adjusted rule, a new shard group and/or a new shard that match/matches the access habit.

In a possible implementation, the adjustment module is configured to: generate the new shard group, and generate, in the new shard group according to the adjusted rule, the new shard that matches the access habit.

In a possible implementation, the adjustment module is further configured to: determine a reference moment in a predetermined shard group, where the predetermined shard group is a shard group in which an obtaining moment of the feature information is located, and the reference moment is a maximum moment at which data is written into the data table before the obtaining moment of the feature information; and determine a start moment of the new shard group based on a time interval between the reference moment and an end moment of the predetermined shard group.

In a possible implementation, the adjustment module is configured to: in response to that the time interval is not less than a time threshold, determine the reference moment as the start moment of the new shard group; and the adjustment module is further configured to update the predetermined shard group, where a start moment of an updated shard group is a start moment of the predetermined shard group, and an end moment of the updated shard group is the reference moment.

In a possible implementation, an end moment of the new shard group is the end moment of the predetermined shard group.

In a possible implementation, the adjustment module is configured to: in response to that the time interval is less than a time threshold, determine the end moment of the predetermined shard group as the start moment of the new shard group.

In a possible implementation, the feature information includes a query fan-out degree, and the query fan-out degree indicates a quantity of nodes that need to be accessed to process the access request.

In a possible implementation, the adjustment module is configured to: in response to that the quantity of nodes indicated by the query fan-out degree is greater than a quantity threshold, determine a sharding key based on a use frequency of an access condition obtained by parsing the access request, and adjust the predetermined rule based on the sharding key to obtain the adjusted rule.

In a possible implementation, the obtaining module is configured to: parse the access request to obtain the access condition, determine, based on the access condition, the node that needs to be accessed to process the access request, and determine the quantity of nodes that need to be accessed as the query fan-out degree.

In a possible implementation, the feature information includes a load imbalance degree, and the load imbalance degree indicates an imbalance degree of load of different nodes.

In a possible implementation, the adjustment module is configured to: in response to that the imbalance degree indicated by the load imbalance degree is greater than a reference threshold, determine shard boundary values based on the load of the different nodes, and adjust the predetermined rule based on the shard boundary values to obtain the adjusted rule.

In a possible implementation, the obtaining module is configured to: determine the load of the different nodes based on at least one of data volumes, quantities of timelines, and access frequencies of the timelines of the different nodes; and determine the load imbalance degree based on the load of the different nodes.

In a possible implementation, the feature information includes a correspondence between a user location and a node location, the user location is a location of the at least one user, and the node location is a location of a node that needs to be accessed to process the access request.

In a possible implementation, the adjustment module is configured to: in response to that a distance between the user location and the node location in the correspondence between the user location and the node location is greater than a distance threshold, determine an updated node whose distance from the user location is not greater than the distance threshold, and adjust the predetermined rule based on the updated node to obtain the adjusted rule.

In a possible implementation, the obtaining module is configured to: parse the access request to obtain an access condition, determine, based on the access condition, the node that needs to be accessed to process the access request, and determine the correspondence between the user location and the node location based on the location of the node that needs to be accessed and the location of the at least one user.

In a possible implementation, the feature information includes at least one of the query fan-out degree, the load imbalance degree, and the correspondence between the user location and the node location.

According to a third aspect, a shard adjustment device for a time series database is provided. The device includes a memory and a processor, the memory stores at least one instruction, and the at least one instruction is loaded and executed by the processor to enable the sharding device to implement the method in the foregoing aspects.

Optionally, there are one or more processors, and there are one or more memories.

Optionally, the memory and the processor may be integrated together, or the memory and the processor may be separately disposed.

In a specific implementation process, the memory may be a non-transitory memory, for example, a read-only memory (ROM). The memory and the processor may be integrated on a same chip, or may be disposed on different chips. A type of the memory and a manner of disposing the memory and the processor are not limited.

According to a fourth aspect, a computer-readable storage medium is provided. The computer-readable storage medium stores at least one instruction, and the instruction is loaded and executed by a processor to implement the method in the foregoing aspects.

According to a fifth aspect, a computer program product is provided. The computer program product includes a computer program or instructions, and the computer program or the instructions are executed by a processor to enable a computer to implement the method in the foregoing aspects.

According to a sixth aspect, a chip is provided. The chip includes a processor configured to invoke instructions stored in a memory from the memory and run the instructions, to enable a communication device in which the chip is installed to perform the method in the foregoing aspects.

According to a seventh aspect, another chip is provided. The chip includes an input interface, an output interface, a processor, and a memory. The input interface, the output interface, the processor, and the memory are connected through an internal connection path. The processor is configured to execute code in the memory. When the code is executed, the processor is configured to perform the method in the foregoing aspects.

BRIEF DESCRIPTION OF THE DRAWINGS

FIG. 3 is a schematic structural diagram of a data table of a time series database according to an embodiment;

FIG. 5A and FIG. 5B are a schematic diagram of a sharding process of a data table of a time series database according to an embodiment;

DETAILED DESCRIPTION

Terms used in embodiments are only used to explain specific embodiments, but are not intended to limit this disclosure.

Figure 1:
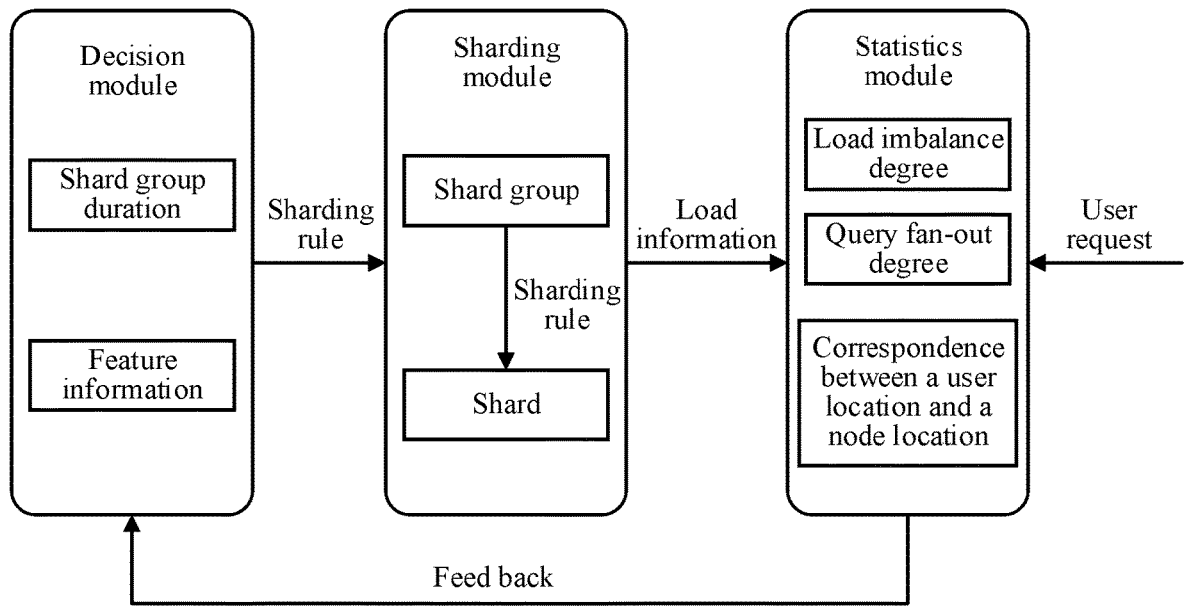
FIG. 1 is a schematic diagram of an implementation environment according to an embodiment.

Embodiments provide a shard adjustment method for a time series database. The method is applied to an implementation environment shown in FIG. 1. In FIG. 1, a statistics module, a decision module, and a sharding module are included. Every two of the statistics module, the decision module, and the sharding module are connected. The statistics module, the decision module, and the sharding module may be integrated into a same hardware device, or may be integrated into different hardware devices, to implement functions that need to be implemented by the modules. For example, the hardware device includes but is not limited to a terminal device, a server, another network device having a sharding requirement, or the like. A type of the hardware device is not limited in embodiments. The following describes the functions that need to be implemented by the modules.

The statistics module is configured to collect statistics on feature information. With reference to FIG. 1, the statistics module collects information related to a user request, and collects load information of each node sent by the sharding module, to obtain the feature information through statistics collection. For example, the feature information is used to reflect an access habit of at least one user for a data table. The feature information includes but is not limited to a correspondence between a user location and a node location, a load imbalance degree, and a query fan-out degree. Then, the statistics module feeds back the collected feature information to the decision module.

The decision module is configured to: receive the feature information sent by the statistics module, and determine, based on the feature information, whether a currently used predetermined rule (e.g., sharding rule) needs to be updated. If the rule needs to be updated, the predetermined rule is further adjusted based on the feature information to obtain an adjusted rule, and the adjusted rule is sent to the sharding module. Certainly, if it is determined, based on the feature information, that the currently used predetermined rule does not need to be updated, the adjusted rule is not sent to the sharding module. In addition, regardless of whether the predetermined rule is updated, after a current shard group ends, the sharding module needs to be indicated to generate a next shard group.

The sharding module is configured to perform sharding according to an indication of the decision module. In response to receiving the adjusted rule sent by the decision module, a new shard group and/or shard are/is generated according to the adjusted rule. In addition, the sharding module further generates, according to an indication of the decision module, the next shard group after the current shard group ends.

Figure 2:
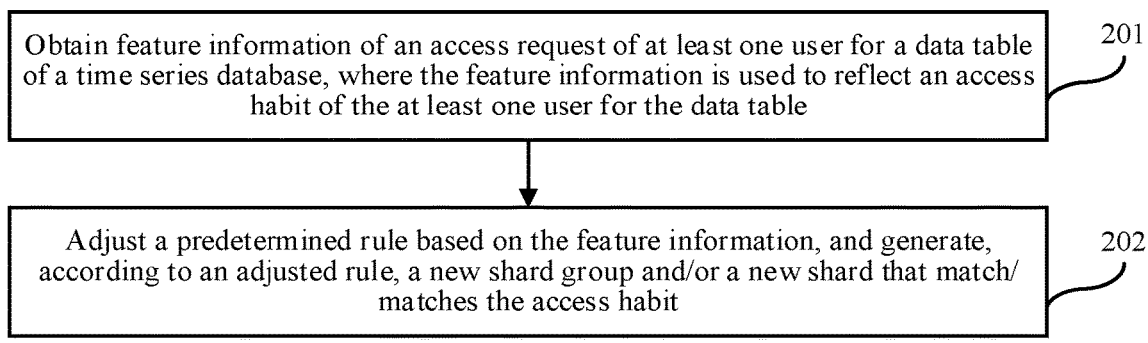
FIG. 2 is a schematic flowchart of a shard adjustment method for a time series database according to an embodiment.

Based on the implementation environment shown in FIG. 1, an embodiment provides a shard adjustment method for a time series database. With reference to FIG. 2, the method includes the following steps.

201: Obtain feature information of an access request of at least one user for a data table of a time series database, where the feature information is used to reflect an access habit of the at least one user for the data table.

In this embodiment, continuous statistics collection is performed based on the access request of the at least one user for the data table of the time series database, to obtain the feature information. Because a statistics collection process is continuous, the feature information obtained through statistics collection may continuously change with time. In some implementations, the feature information is obtained once every reference duration. The reference duration is not limited in this embodiment, and the reference duration may be set based on experience. The feature information is described in detail below. Details are not described herein. The following describes the time series database and the data table of the time series database.

The time series database is also referred to as a time-series database, and is a database used to process time series data. The time series data is data corresponding to a timestamp. In the time series database, pieces of time series data are stored in a form of the data table, and the pieces of time series data are arranged in a time sequence in the data table. One piece of time series data includes a timestamp, a tag, and at least one piece of indicator data. The at least one piece of indicator data includes data generated by a data source and/or data (also referred to as metadata) indicating a data source attribute, and the tag is used to uniquely identify the data source. For example, refer to FIG. 3. FIG. 3 shows an example of the data table of the time series database. Each row in the data table is one piece of time series data. In FIG. 3, a data source used to generate indicator data is a device, a tag is a device identifier (device_id), and the indicator data includes data generated by the data source and data indicating a data source attribute. The data generated by the data source includes a central processing unit (CPU) average per minute (cpu_1m_avg), free memory (free_mem), and a temperature, and the data indicating the data source attribute includes a location identifier (location_id) and a development type (dev_type).

In this embodiment, the data table of the time series database is divided into a plurality of shard groups according to a predetermined rule, and each shard group is divided into a plurality of shards. Each shard group is set in a different time period, and each shard is set in a different node. The shard group and the shard are described with reference to FIG. 4.

Figure 4:
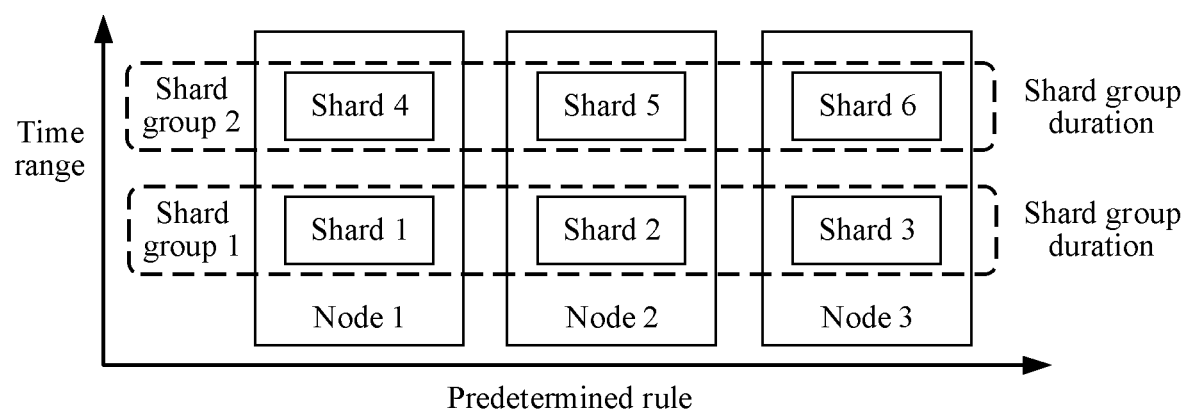
FIG. 4 is a schematic diagram of a sharding process of a data table of a time series database according to an embodiment.

With reference to vertical coordinates in FIG. 4, the data table is first divided into a plurality of shard groups based on time ranges, and the shard groups are also referred to as time shards. Each shard group is set in a different time period, and the time period is also referred to as shard group duration. For example, different shard groups may have same or different duration. The shard group duration is not limited in this embodiment. For example, a time period of a shard group is 0:00 to 24:00 on Monday, and a time period of another shard group is 0:00 to 24:00 on Tuesday. The two shard groups are in different time periods (which are separately Monday and Tuesday), but the two shard groups have same duration (where both are 24 hours). For example, shard groups are generated in sequence. In other words, after a shard group ends, a next shard group is generated. For example, if a time period of a shard group is 0:00 to 24:00 on Monday, the shard group ends at 24:00 on Monday, and a next shard group is generated at this point of time (that is, 24:00 on Monday).

With reference to horizontal coordinates in FIG. 4, each shard group is divided into a plurality of shards according to the predetermined rule, the plurality of shards are separately set in different nodes of the database, and each shard includes at least one piece of time series data in the data table. For example, the predetermined rule includes but is not limited to at least one of the tag and each piece of indicator data that are included in the time series data, and the predetermined rule is not limited in this embodiment.

Figure 5B:
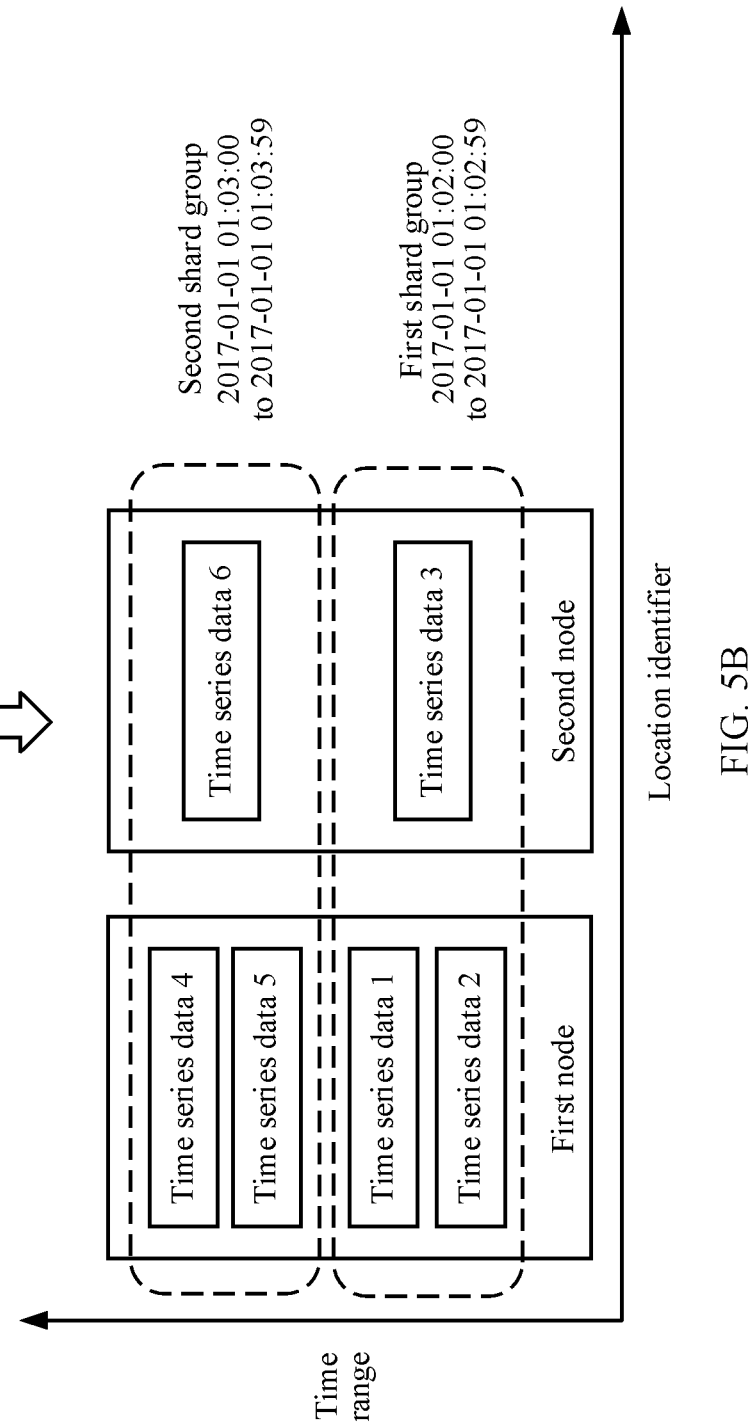

It can be learned from the foregoing descriptions with reference to FIG. 4 that, in some implementations, dividing the data table of the time series database into a plurality of shard groups according to the predetermined rule and dividing each shard group into a plurality of shards includes: dividing the data table into a plurality of shard groups based on time ranges, and dividing each shard group into a plurality of shards according to the predetermined rule. A case shown in FIG. 5A and FIG. 5B is used as an example to describe a sharding process of the data table of the time series database in this implementation.

First, the data table is divided into two shard groups by using one minute as a time period. A time period of the first shard group is 2017 Jan. 1 01:02:00 to 2017 Jan. 1 01:02:59. In this case, the first shard group includes time series data 1, time series data 2, and time series data 3. A time period of the second shard group is 2017 Jan. 1 01:03:00 to 2017 Jan. 1 01:03:59. In this case, the second shard group includes time series data 4, time series data 5, and time series data 6.

In the first shard group and the second shard group, "location identifier" is used as the predetermined rule to divide each of the first shard group and the second shard group into two shards. As shown in FIG. 5A and FIG. 5B, the first shard in the first shard group includes the time series data 1 and the time series data 2 (where location identifiers are both 42), and the second shard in the first shard group includes the time series data 3 (where a location identifier is 77). The first shard in the second shard group includes the time series data 4 and the time series data 5 (where location identifiers are both 42), and the second shard in the second shard group includes the time series data 6 (where a location identifier is 77). The first shard in the first shard group and the first shard in the second shard group are both set in the first node, and the second shard in the first shard group and the second shard in the second shard group are both set in the second node.

It should be noted that, after a plurality of shards are obtained by dividing a shard group according to the predetermined rule, only time series data in a time period of the shard group is written into the shards obtained through division according to the predetermined rule, and time series data that has been written into the data table before the time period of the shard group is not written again. For example, a time period of a shard group is 0:00 to 24:00 on Monday. After a plurality of shards are obtained through division according to the predetermined rule, if time series data that needs to be written into the data table is obtained during 0:00 to 24:00 on Monday, the time series data is written into the shards obtained through division according to the predetermined rule, and time series data that has been written into the data table before 0:00 on Monday is not written again.

202: Adjust the predetermined rule based on the feature information, and generate, according to an adjusted rule, a new shard group and/or a new shard that match/matches the access habit.

It can be learned from the descriptions in 201 that the data table has been divided into shard groups and shards according to the predetermined rule, and the feature information is used to reflect the access habit of the at least one user for the data table. For example, "in response to that the feature information meets a condition" indicates that the shard groups and the shards obtained through division according to the predetermined rule do not match the access habit reflected by the feature information. If the predetermined rule continues to be used, an exception may occur. Therefore, when the feature information meets the condition, the predetermined rule needs to be adjusted based on the feature information, so that the new shard group and/or the new shard that match/matches the access habit are/is generated according to the adjusted rule. A manner in which the feature information meets the condition is described in detail with the feature information below. Details are not described herein.

In an example embodiment, generating, according to the adjusted rule, the new shard group and/or the new shard that match/matches the access habit includes: generating the new shard group, and generating, in the new shard group according to the adjusted rule, the new shard that matches the access habit. Because the new shard group is set in a time period, the new shard group corresponds to a start moment and an end moment. In this embodiment, the start moment and the end moment of the new shard group need to be determined.

In an example embodiment, the method further includes: determining a reference moment in a predetermined shard group; and determining the start moment of the new shard group based on a time interval between the reference moment and an end moment of the predetermined shard group. The predetermined shard group is a shard group in which an obtaining moment of the feature information is located. The reference moment is a maximum moment at which data is written into the data table before the obtaining moment of the feature information.

It can be learned based on the descriptions in 201 that data that has been written into the data table is not written again. Therefore, the maximum moment at which data is written into the data table, namely, the reference moment, needs to be determined, and the predetermined rule can be adjusted only after the reference moment. For example, because the time series data in the data table includes the timestamp, in this embodiment, a largest timestamp in the data table is obtained, and a moment indicated by the largest timestamp is determined as the reference moment. Certainly, such a manner of determining the reference moment is merely an example, and is not used to limit a manner of determining the reference moment in this embodiment.

In an example embodiment, manners of determining the start moment of the new shard group based on the time interval between the reference moment and the end moment of the predetermined shard group includes the following two manners A1 and A2.

Manner A1: In response to that the time interval between the reference moment and the end moment of the predetermined shard group is less than a time threshold, determine the end moment of the predetermined shard group as the start moment of the new shard group.

It can be learned based on the descriptions in 201 that shard groups are generated in sequence, and after a shard group ends, a next shard group is generated. "In response to that the time interval between the reference moment and the end moment of the predetermined shard group is less than the time threshold" indicates that a time interval between the reference moment and a moment at which a next shard group is generated is short. Therefore, in this embodiment, the reference moment is not used as the start moment of the new shard group, in other words, the new shard group is not generated immediately and the predetermined rule is not adjusted immediately. Instead, the predetermined rule is adjusted when the next shard group is generated after the predetermined shard group ends. It can be understood that, because the time interval is short, even if the predetermined rule is still used for sharding between the reference moment and the end moment of the predetermined shard group, an exception caused by the predetermined rule cannot be improved before the predetermined shard group ends, and no serious consequence is caused. For example, the time threshold is one hour, a time period of the predetermined shard group is 0:00 to 24:00 on Monday, and the reference moment is 23:30 on Monday. Because the time interval between the reference moment and the end moment (that is, 24:00 on Monday) of the predetermined shard group is 30 minutes, and is less than the time threshold of one hour, the end moment of the predetermined shard group is used as the start moment of the new shard group.

In the manner A1, the end moment of the new shard group may be any moment later than the start moment of the new shard group. For example, in this embodiment, shard group duration of the predetermined shard group is consistent with that of the new shard group. For example, if the time period of the predetermined shard group is 0:00 to 24:00 on Monday, a time period of the new shard group is 0:00 to 24:00 on Tuesday.

Manner A2: In response to that the time interval between the reference moment and the end moment of the predetermined shard group is not less than a time threshold, determine the reference moment as the start moment of the new shard group.

"In response to that the time interval between the reference moment and the end moment of the predetermined shard group is not less than the time threshold" indicates that a time interval between the reference moment and a moment at which a next shard group is generated is long. If the predetermined rule is still adjusted after the predetermined shard group ends, an exception caused by the predetermined rule may exist for a long time, and therefore cause a serious consequence. Therefore, in the manner A2, the reference moment is determined as the start moment of the new shard group, in other words, the new shard group is generated immediately, so that the predetermined rule is adjusted in the new shard group. Therefore, timely adjustment of the predetermined rule is ensured. For example, the time threshold is one hour, a time period of the predetermined shard group is 0:00 to 24:00 on Monday, and the reference moment is 14:00 on Monday. Because the time interval between the reference moment and the end moment (that is, 24:00 on Monday) of the predetermined shard group is eight hours, and is greater than the time threshold of one hour, the reference moment is determined as the start moment of the new shard group.

In addition, in the manner A2, because different shard groups need to be set in different time periods, and a time period after the reference moment in the predetermined shard group has been used for the new shard group, the predetermined shard group further needs to be updated. In an example embodiment, the method further includes: updating the predetermined shard group, where a start moment of an updated shard group is a start moment of the predetermined shard group, and an end moment of the updated shard group is the reference moment. An example in which the time period of the predetermined shard group is 0:00 to 24:00 on Monday, and the reference moment is 14:00 on Monday is still used. In this case, the start moment of the updated shard group is 0:00 on Monday, and the end moment of the updated shard group is 14:00 on Monday.

Figure 6:
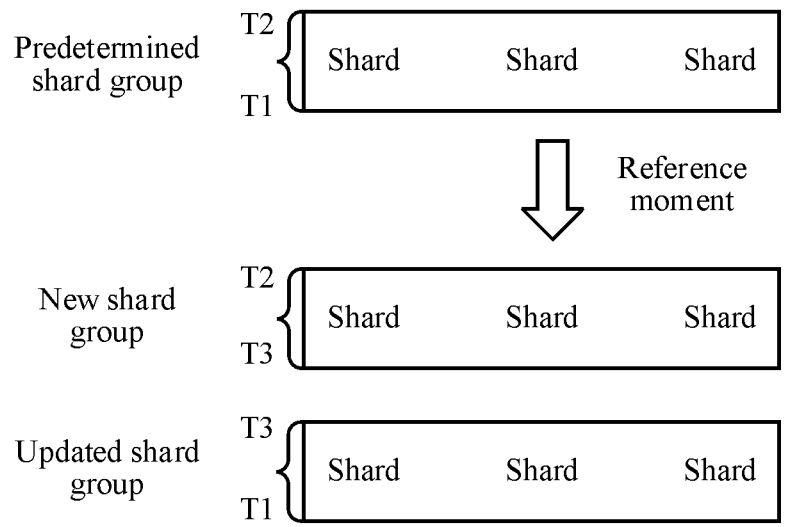
FIG. 6 is a schematic diagram of a shard group according to an embodiment.

In an example embodiment, the end moment of the new shard group in the manner A2 is the end moment of the predetermined shard group. For example, the time period of the predetermined shard group is [T1, T2], and the reference moment is T3 between T1 and T2. In this case, the start moment of the new shard group is T3 that is consistent with the reference moment, and the end moment of the new shard group is the end moment T2 of the predetermined shard group. With reference to FIG. 6, in this case, the reference moment is used as a demarcation point, and the predetermined shard group is divided into two different shard groups. One is the new shard group [T3, T2], and the other is the updated shard group [T1, T3]. Certainly, the end moment of the new shard group is not limited in this embodiment. The end moment of the new shard group may be later than the end moment of the predetermined shard group, or may be earlier than the end moment of the predetermined shard group.

It can be understood that, in an actual process, 201 and 202 can be performed for a plurality of times, to ensure that a sharding rule can be continuously updated based on an actual requirement to enable the sharding rule to adapt to the access habit of the user, and ensure read/write performance of each node of the database.

In addition, 202 is for a case in which the feature information meets the condition and the predetermined rule needs to be adjusted. "In response to that the feature information does not meet the condition" indicates that performing sharding according to the predetermined rule does not cause occurrence of an exception. Therefore, the predetermined rule does not need to be adjusted, and the predetermined rule is still used. For example, after the predetermined shard group ends, the next shard group is directly generated, and a plurality of shards are still obtained through division in the next shard group according to the predetermined rule. A start moment of the next shard group is the end moment of the predetermined shard group. An end moment of the next shard group is not limited in this embodiment.

The foregoing describes a shard adjustment process of the time series database in this embodiment. The following describes in detail content that is not described in the foregoing descriptions.

In an example embodiment, the feature information of the data table includes at least one of a correspondence between a user location and a node location, a load imbalance degree, and a query fan-out degree. It can be understood that the foregoing feature information is merely an example, and is not intended to limit this embodiment. In this embodiment, other information may also be used as the feature information corresponding to the data table based on an actual requirement. The query fan-out degree, the load imbalance degree, and the correspondence between the user location and the node location are separately described in a case B1 to a case B3.

Case B1: The query fan-out degree indicates a quantity of nodes that need to be accessed to process the access request. For example, a manner of obtaining the query fan-out degree includes: parsing the access request to obtain an access condition, determining, based on the access condition, the node that needs to be accessed to process the access request, and determining the quantity of nodes that need to be accessed as the query fan-out degree. The access request is used to read/write data from/into the data table, and a node or nodes that need to be accessed to process the access request are determined based on the access condition in the access request. For example, the access condition is to access data in an area A in a specific time period, and the data in the area A in the time period is located in a node 1 and a node 2. In this case, it can be determined that nodes that need to be accessed are the node 1 and the node 2. After the node that needs to be accessed is determined, the quantity of nodes that need to be accessed can be counted, to determine the query fan-out degree based on the quantity of nodes that need to be accessed. In some implementations, the quantity of nodes that need to be accessed is directly used as the query fan-out degree. For example, in the foregoing example, the nodes that need to be accessed are the node 1 and the node 2, and the quantity of nodes that need to be accessed is 2. In this case, it is determined that the query fan-out degree is 2. In some other implementations, a ratio of the quantity of nodes that need to be accessed to all nodes included in the database is used as the query fan-out degree. An example in which the quantity of nodes that need to be accessed is 2 is still used. If the database includes 10 nodes, 2/10 is used as the query fan-out degree.

In an example embodiment, adjusting the predetermined rule based on the feature information includes: in response to that the quantity of nodes indicated by the query fan-out degree is greater than a quantity threshold, determining a sharding key based on a use frequency of the access condition obtained by parsing the access request, and adjusting the predetermined rule based on the sharding key to obtain the adjusted rule. It can be learned that, "in response to that the quantity of nodes indicated by the query fan-out degree is greater than the quantity threshold" indicates that the feature information meets the condition, and the predetermined rule needs to be adjusted.

"In response to that the quantity of nodes indicated by the query fan-out degree is greater than the quantity threshold" indicates that a currently used sharding key does not match the access habit of the user. For example, the currently used sharding key is "time". A shard group includes a total of 10 sub-time periods A0 to A9. Time series data of one sub-time period is located in a same node, and time series data of one area may be distributed in different nodes. When the access condition is "area", for example, when all time series data in an area B0 needs to be read/written, all 10 nodes may need to be accessed to obtain all the time series data in the area B0. Therefore, the query fan-out degree is large, and may be greater than the quantity threshold. Therefore, the new sharding key needs to be determined based on the access condition to obtain the adjusted rule.

In some implementations, the adjusting the predetermined rule based on the sharding key to obtain the adjusted rule includes: using an access condition with the highest use frequency as the sharding key, and replacing the predetermined rule with the sharding key to obtain the adjusted rule. For example, if the access condition with the highest use frequency is "area", "area" is used as the sharding key. The foregoing example is still used. After "area" is used as the sharding key, time series data of one area is located in a same node, and is not distributed in different nodes. When all the time series data in the area B0 needs to be read/written, only a node corresponding to the area B0 needs to be accessed, so that the query fan-out degree is reduced. In some other implementations, in this embodiment, access conditions are arranged in descending order of use frequencies to obtain an access condition sequence, and a reference quantity of access conditions in the front of the access condition sequence are used as the sharding key. The reference quantity is not limited in this embodiment, and the reference quantity is a positive integer not less than 2. For example, an access condition with the highest use frequency is "area", an access condition with the second highest use frequency is "time", and the reference quantity is 2. In this case, "area" and "time" are jointly used as the adjusted rule.

When the data table is created, the user may randomly set a sharding key, or set a sharding key based on an actual requirement during creation. However, in a process of using the data table, a user service may change. Consequently, the previously set sharding key is no longer applicable to a current service of the user, and shards obtained through division based on the sharding key do not match the access habit of the user. In this embodiment, the sharding key is adjusted based on the query fan-out degree, so that an adjusted sharding key adapts to a status of the current service of the user, and shards obtained through division based on the adjusted sharding key match the access habit of the user. Therefore, read/write performance of nodes is improved.

Case B2: The load imbalance degree indicates an imbalance degree of load of different nodes. For example, a manner of obtaining the load imbalance degree includes: determining the load of the different nodes based on at least one of data volumes, quantities of timelines, and access frequencies of the timelines of the different nodes; and determining the load imbalance degree based on the load of the different nodes. The timeline is in a one-to-one correspondence with a data source, and one timeline includes one or more pieces of time series data corresponding to a data source. For example, in the case shown in FIG. 3, a timeline corresponding to a data source abc123 includes time series data 1 and time series data 4. In addition, the access frequency of the timeline is a frequency of performing reading/writing for the timeline.

In some implementations, the different nodes are nodes in which shards of the data table are set. For example, the database includes a total of 10 nodes, and in a shard group, the data table includes five shards set in five nodes. In this case, the different nodes refer to the five nodes, in the 10 nodes, in which the shards are set. In some other implementations, the different nodes are all nodes included in the database. For example, the database includes a total of 10 nodes, and the 10 nodes are the different nodes.

For example, the determining the load imbalance degree based on the load of the different nodes includes: for a node, determining a load value of the node based on load of the node, and determining the load imbalance degree based on load values of the different nodes. For example, a variance of the load values of the nodes is calculated, and the variance is used as the load imbalance degree. In some implementations, the determining a load value of the node based on load of the node includes: determining a first sub-value based on a data volume of the node, determining a second sub-value based on a quantity of timelines of the node, determining a third sub-value based on an access frequency of the timeline of the node, and using a weighted sum of the first sub-value, the second sub-value, and the third sub-value as the load value of the node. Weights of different sub-values are the same or different, and the weights of the different sub-values are not limited in this embodiment.

In an example embodiment, adjusting the predetermined rule based on the feature information includes: in response to that the imbalance degree indicated by the load imbalance degree is greater than a reference threshold, determining shard boundary values between the different nodes based on the load of the different nodes, and adjusting the predetermined rule based on the shard boundary values to obtain the adjusted rule. It can be learned that "in response to that the imbalance degree indicated by the load imbalance degree is greater than the reference threshold" indicates that the feature information meets the condition, and the predetermined rule needs to be adjusted.

When load imbalance exists between the different nodes, a node with heavy load is limited by a node processing capability, resulting in poor read/write performance of the node with the heavy load. In addition, a node with light load cannot fully use a node processing capability, resulting in a waste of the node processing capability. Therefore, a load imbalance situation needs to be improved. In this embodiment, the load of the different nodes is adjusted by modifying the shard boundary values, to implement load balancing between the different nodes. For example, the adjusting the predetermined rule based on the shard boundary values to obtain the adjusted rule includes: replacing the predetermined rule with the shard boundary values to obtain the adjusted rule. For example, when the load of the different nodes is adjusted, adjustment may be performed in a unit of a timeline, and the unit is not limited in this embodiment. An example in which the unit is the timeline is used for description below.

In the predetermined shard group, a node A includes timelines 0 to 999, and a node B includes timelines 1000 to 1999. In this case, shard boundary values are 999 and 1000. In the predetermined shard group, if load of the node A is heavy and load of the node B is light, load imbalance exists between the node A and the node B. Therefore, the load of the node A needs to be reduced and the load of the node B needs to be increased, to implement load balancing between the node A and the node B. For example, the shard boundary values are adjusted from 999 and 1000 to 599 and 600. In this case, in the new shard group, time series data corresponding to data sources corresponding to timelines 0 to 599 is written into the node A, and time series data corresponding to data sources corresponding to timelines 600 to 1999 is written into the node B. In this case, load balancing is implemented between the node A and the node B in the time period of the new shard group.

It should be emphasized that, in the foregoing load balancing process, when load imbalance occurs in the time period of the predetermined shard group, shard boundary value adjustment is performed in the time period of the new shard group, to implement load balancing in the time period of the new shard group. Therefore, a process of migrating time series data between different nodes is not involved. In this way, a conflict between a data migration process between the different nodes and a normal database access process of the user is avoided, and therefore impact on read/write performance of the nodes is avoided. Because shard boundary value adjustment is not performed in the time period of the predetermined shard group, a load imbalance situation still exists in the time period of the predetermined shard group. However, because the time series database usually pays most attention to the new shard group, implementing load balancing in the time period of the new shard group can meet a requirement of the database for load balancing between different nodes.

Case B3: In the correspondence between the user location and the node location, the user location is a location of the at least one user, and the node location is a location of a node that needs to be accessed to process the access request. For example, obtaining the correspondence between the user location and the node location includes: parsing the access request to obtain an access condition, determining, based on the access condition, the node that needs to be accessed to process the access request, and determining the correspondence between the user location and the node location based on the location of the node that needs to be accessed and the location of the at least one user. The access request may carry an identifier of user equipment, and the identifier of the user equipment is used to uniquely indicate the user equipment. Therefore, a user location can be determined based on the identifier of the user equipment. For a process of determining the node that needs to be accessed, refer to the foregoing descriptions. Details are not described herein again. For example, when there is one node that needs to be accessed, a node location and the user location are directly stored in a correspondence manner. In this case, a correspondence between the user location and the node location is a one-to-one correspondence. When there are a plurality of nodes that need to be accessed, a node location of each node and the user location may be stored in a correspondence manner. In this case, a correspondence between the user location and node locations is a one-to-many correspondence.

In an example embodiment, the feature information includes the correspondence between the user location and the node location, and adjusting the predetermined rule based on the feature information includes: in response to that a distance between the user location and the node location in the correspondence between the user location and the node location is greater than a distance threshold, determining an updated node whose distance from the user location is not greater than the distance threshold, and adjusting the predetermined rule based on the updated node to obtain the adjusted rule. It can be learned that "in response to that the distance between the user location and the node location in the correspondence between the user location and the node location is greater than the distance threshold" indicates that the feature information meets the condition, and the predetermined rule needs to be adjusted.

In an access process, time series data that needs to be read/written is transmitted between user equipment and a node device. Therefore, a longer distance between the user location and the node location indicates a longer distance required for transmitting the time series data. This may cause an increase in a quantity of routing times and reduce read/write performance of the node. Therefore, the time series data that needs to be read/written is adjusted to be stored in a node whose distance from the user equipment is not greater than the distance threshold, that is, adjusted to be stored in the updated node. For example, during adjustment, the adjustment may be performed in a unit of a timeline, and the unit is not limited in this embodiment. An example in which the unit is the timeline is used for description below.

In the predetermined shard group, a timeline that needs to be accessed is located in a node A, and a distance between a location of the node A and the user location exceeds the distance threshold. In this case, a node whose distance from the user location does not exceed the distance threshold, for example, a node B that is closest to the user location, is selected from all nodes included in the database, so that time series data corresponding to a data source corresponding to the timeline is written into the node B in the new shard group, and is no longer written into the node A. In this case, when the user needs to access the timeline subsequently, the user only needs to access the node B. Therefore, a data transmission distance is shortened, and read/write performance of the node is improved.

In an example embodiment, the feature information includes at least two of the load imbalance degree, the query fan-out degree, and the correspondence between the user location and the node location, and the adjusting the predetermined rule based on the feature information includes the following two manners C1 and C2.

Manner C1: Adjust the predetermined rule based on a condition whose priority meets a threshold.

In this embodiment, a priority is set for each condition that is met, and the priority indicates a priority degree of the condition. A higher priority indicates a higher priority degree. For example, adjusting the predetermined rule based on the condition whose priority meets the threshold includes: adjusting the predetermined rule based on a condition with the highest priority.

For example, priorities of conditions in descending order are sequentially as follows: a condition 1—a quantity of nodes indicated by the query fan-out degree is greater than a quantity threshold, a condition 2—an imbalance degree indicated by the load imbalance degree is greater than a reference threshold, and a condition 3—a distance between the user location and the node location exceeds a distance threshold. In response to that both the condition 1 and the condition 2 are met, the predetermined rule is adjusted based on the condition 1 with the highest priority, in other words, the predetermined rule is adjusted based on the descriptions in the case C1, so that a sharding key is used as the adjusted rule.

Manner C2: Adjust the predetermined rule based on all conditions that are met.

In this case, a sharding sub-rule is determined for each condition that is met, and then sharding sub-rules are combined as the adjusted rule. The example in the manner C1 is still used. When both the condition 1 and the condition 2 are met, a sharding sub-rule determined based on the condition 1 is a sharding key, and a sharding sub-rule determined based on the condition 2 is shard boundary values. Therefore, both the sharding key and the shard boundary values are used as the adjusted rule.

In conclusion, in this embodiment, the predetermined rule is adjusted based on the feature information, and the new shard group and/or shard that match/matches the access habit of the user for the data table are/is generated according to the adjusted rule. The sharding rule can be updated in time, to avoid occurrence of an exception caused by an improper sharding rule, so that a shard group and/or a shard match/matches the access habit of the user, and read/write performance of nodes in the time series database is ensured.

Figure 7:
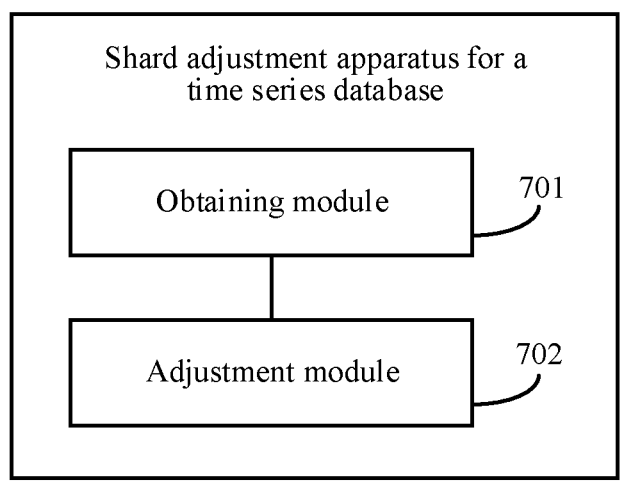
FIG. 7 is a schematic structural diagram of a shard adjustment apparatus for a time series database according to an embodiment.

The foregoing describes the shard adjustment method for time series data provided in embodiments. In correspondence to the method, embodiments further provide a shard adjustment apparatus for a time series database. FIG. 7 is a schematic structural diagram of a shard adjustment apparatus for a time series database according to an embodiment. The apparatus may be applied to the hardware device shown in FIG. 1. Based on the following plurality of modules shown in FIG. 7, the shard adjustment apparatus for a time series database shown in FIG. 7 can perform the operations in the method embodiment shown in FIG. 2. It should be understood that the apparatus may include more additional modules than the shown modules or omit some of the shown modules. This is not limited in this embodiment. As shown in FIG. 7, the shard adjustment apparatus for a time series database provided in this embodiment includes the following modules.

An obtaining module 701 is configured to obtain feature information of an access request of at least one user for a data table of a time series database, where the data table is divided into a plurality of shard groups according to a predetermined rule, each shard group is divided into a plurality of shards, each shard group is set in a different time period, each shard is set in a different node, and the feature information is used to reflect an access habit of the at least one user for the data table. For steps performed by the obtaining module 701, refer to the descriptions in 201. Details are not described herein again.

An adjustment module 702 is configured to: adjust the predetermined rule based on the feature information, and generate, according to an adjusted rule, a new shard group and/or a new shard that match/matches the access habit. For steps performed by the adjustment module 702, refer to the descriptions in 202. Details are not described herein again.

In a possible implementation, the adjustment module 702 is configured to: generate the new shard group, and generate, in the new shard group according to the adjusted rule, the new shard that matches the access habit.

In a possible implementation, the adjustment module 702 is further configured to: determine a reference moment in a predetermined shard group, where the predetermined shard group is a shard group in which an obtaining moment of the feature information is located, and the reference moment is a maximum moment at which data is written into the data table before the obtaining moment of the feature information; and determine a start moment of the new shard group based on a time interval between the reference moment and an end moment of the predetermined shard group.

In a possible implementation, the adjustment module 702 is configured to: in response to that the time interval is not less than a time threshold, determine the reference moment as the start moment of the new shard group; and the adjustment module 702 is further configured to update the predetermined shard group, where a start moment of an updated shard group is a start moment of the predetermined shard group, and an end moment of the updated shard group is the reference moment.

In a possible implementation, an end moment of the new shard group is the end moment of the predetermined shard group.

In a possible implementation, the adjustment module 702 is configured to: in response to that the time interval is less than a time threshold, determine the end moment of the predetermined shard group as the start moment of the new shard group.

In a possible implementation, the feature information includes a query fan-out degree, and the query fan-out degree indicates a quantity of nodes that need to be accessed to process the access request.

In a possible implementation, the adjustment module 702 is configured to: in response to that the quantity of nodes indicated by the query fan-out degree is greater than a quantity threshold, determine a sharding key based on a use frequency of an access condition obtained by parsing the access request, and adjust the predetermined rule based on the sharding key to obtain the adjusted rule.

In a possible implementation, the obtaining module 701 is configured to: parse the access request to obtain the access condition, determine, based on the access condition, the node that needs to be accessed to process the access request, and determine the quantity of nodes that need to be accessed as the query fan-out degree.

In a possible implementation, the feature information includes a load imbalance degree, and the load imbalance degree indicates an imbalance degree of load of different nodes.

In a possible implementation, the adjustment module 702 is configured to: in response to that the imbalance degree indicated by the load imbalance degree is greater than a reference threshold, determine shard boundary values based on the load of the different nodes, and adjust the predetermined rule based on the shard boundary values to obtain the adjusted rule.

In a possible implementation, the obtaining module 701 is configured to: determine the load of the different nodes based on at least one of data volumes, quantities of timelines, and access frequencies of the timelines of the different nodes; and determine the load imbalance degree based on the load of the different nodes.

In a possible implementation, the feature information includes a correspondence between a user location and a node location, the user location is a location of the at least one user, and the node location is a location of a node that needs to be accessed to process the access request.

In a possible implementation, the adjustment module 702 is configured to: in response to that a distance between the user location and the node location in the correspondence between the user location and the node location is greater than a distance threshold, determine an updated node whose distance from the user location is not greater than the distance threshold, and adjust the predetermined rule based on the updated node to obtain the adjusted rule.

In a possible implementation, the obtaining module 701 is configured to: parse the access request to obtain an access condition, determine, based on the access condition, the node that needs to be accessed to process the access request, and determine the correspondence between the user location and the node location based on the location of the node that needs to be accessed and the location of the at least one user.

In a possible implementation, the feature information includes at least one of the query fan-out degree, the load imbalance degree, and the correspondence between the user location and the node location.

In conclusion, in this embodiment, the predetermined rule is adjusted based on the feature information, and the new shard group and/or shard that match/matches the access habit of the user for the data table are/is generated according to the adjusted rule. A sharding rule can be updated in time, to avoid occurrence of an exception caused by an improper sharding rule, so that a shard group and/or a shard match/matches the access habit of the user, and read/write performance of nodes in the time series database is ensured.

It should be understood that, when the apparatus provided in FIG. 7 implements functions of the apparatus, division into the functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatus provided in the foregoing embodiment and the method embodiment pertain to a same concept. For a specific implementation process of the apparatus, refer to the method embodiment. Details are not described herein again.

This disclosure provides a shard adjustment device for a time series database. The device includes a communication interface and a processor. Optionally, the communication device further includes a memory. The communication interface, the memory, and the processor communicate with each other through an internal connection path. The memory is configured to store instructions. The processor is configured to execute the instructions stored in the memory, to control the communication interface to receive a signal and control the communication interface to send a signal. When the processor executes the instructions stored in the memory, the processor is enabled to perform any example shard adjustment method for a time series database provided in this disclosure.

Figure 8:
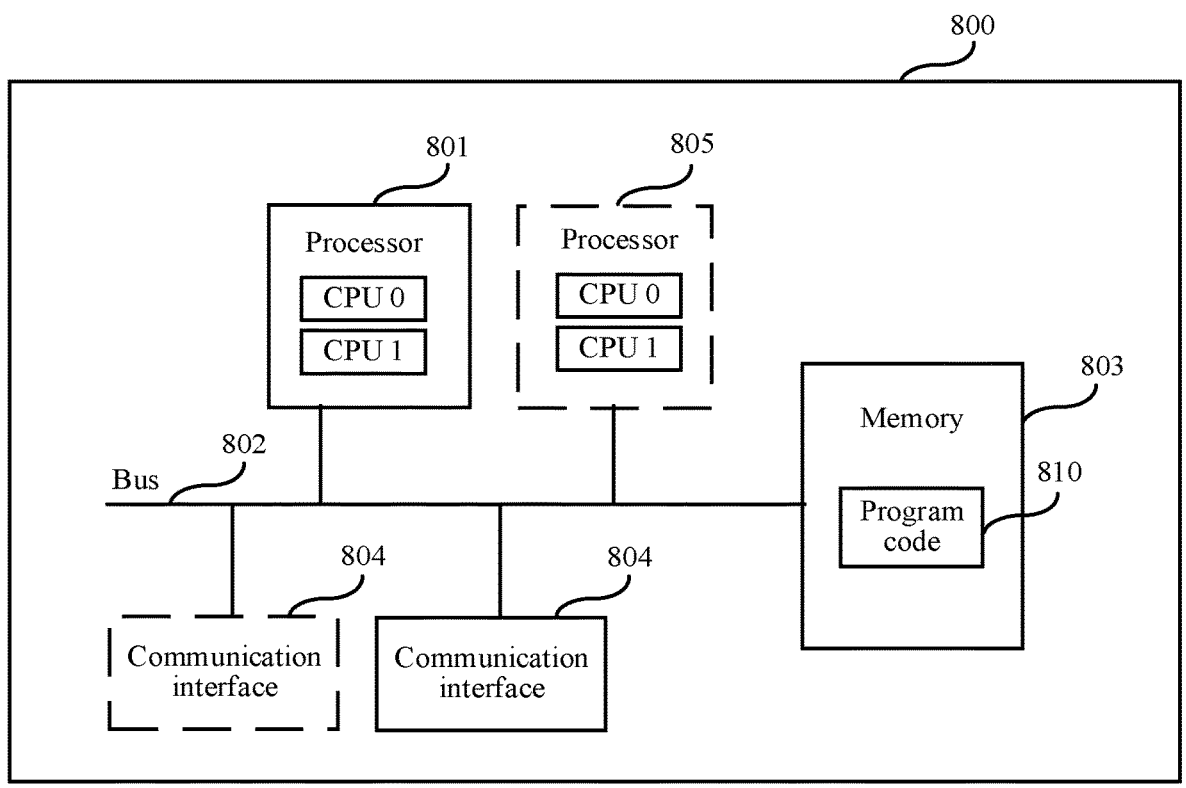
FIG. 8 is a schematic structural diagram of a shard adjustment device for a time series database according to an embodiment.

FIG. 8 is a schematic structural diagram of an example shard adjustment device 800 for a time series database. The device 800 shown in FIG. 8 is configured to perform the operations related to the shard adjustment method for a time series database shown in FIG. 2. The device 800 is, for example, a server, a server cluster including a plurality of servers, or a cloud computing service center.

As shown in FIG. 8, the device 800 includes at least one processor 801, a memory 803, and at least one communication interface 804.

The processor 801 is, for example, a general-purpose CPU, a digital signal processor (DSP), a network processor (NP), a GPU, a neural network processing unit (NPU), a data processing unit (DPU), a microprocessor or one or more integrated circuits or application-specific integrated circuits (ASICs) configured to implement the solutions of this disclosure, a programmable logic device (PLD) or another programmable logic device, a transistor logic device, a hardware component, or any combination thereof. The PLD is, for example, a complex PLD (CPLD), a field-programmable gate array (FPGA), a generic array logic (GAL), or any combination thereof. The processor may implement or execute various logical blocks, modules, and circuits described with reference to the disclosed content. Alternatively, the processor may be a combination of processors implementing a computing function, for example, a combination of one or more microprocessors, or a combination of a DSP and a microprocessor.

Optionally, the device 800 further includes a bus 802. The bus 802 is configured to transmit information between components of the device 800. The bus 802 may be a Peripheral Component Interconnect (PCI) bus, an Extended Industry Standard Architecture (EISA) bus, or the like. The bus 802 may be classified as an address bus, a data bus, a control bus, or the like. For ease of representation, the bus is represented by using only one line in FIG. 8. However, it does not mean that there is only one bus or only one type of bus.

The memory 803 is, for example, a read-only memory (ROM) or another type of storage device that can store static information and instructions, a random-access memory (RAM) or another type of dynamic storage device that can store information and instructions, an electrically erasable programmable ROM (EEPROM), a compact disc ROM (CD-ROM) or another compact disc storage, an optical disc storage (including a compact disc, a laser disc, an optical disc, a digital versatile disc (DVD), a Blu-ray disc, or the like), a magnetic disk storage medium or another magnetic storage device, or any other medium that can be used to carry or store expected program code in a form of instructions or a data structure and that can be accessed by a computer. However, the memory 803 is not limited thereto. For example, the memory 803 exists independently, and is connected to the processor 801 through the bus 802. Alternatively, the memory 803 may be integrated with the processor 801.

The communication interface 804 is configured to communicate with another device or a communication network by using any transceiver-type apparatus. The communication network may be an Ethernet, a radio access network (RAN), a wireless local area network (WLAN), or the like. The communication interface 804 may include a wired communication interface, and may further include a wireless communication interface. Specifically, the communication interface 804 may be an Ethernet interface, for example, a Fast Ethernet (FE) interface, a gigabit Ethernet (GE) interface, an Asynchronous Transfer Mode (ATM) interface, a WLAN interface, a cellular network communication interface, or a combination thereof. The Ethernet interface may be an optical interface, an electrical interface, or a combination thereof. In some implementations, the communication interface 804 may be used by the device 800 to communicate with another device.

During specific implementation, in some implementations, the processor 801 may include one or more CPUs, for example, a CPU 0 and a CPU 1 shown in FIG. 8. Each of the processors may be a single-core processor, or may be a multi-core processor. The processor herein may be one or more devices, circuits, and/or processing cores configured to process data (for example, computer program instructions).

During specific implementation, in some implementations, the device 800 may include a plurality of processors, for example, the processor 801 and a processor 805 shown in FIG. 8. Each of the processors may be a single-core processor, or may be a multi-core processor. The processor herein may be one or more devices, circuits, and/or processing cores configured to process data (for example, computer program instructions).

In some implementations, the memory 803 is configured to store program code 810 for executing the solutions of this disclosure, and the processor 801 may execute the program code 810 stored in the memory 803. In other words, the device 800 may implement, by using the processor 801 and the program code 810 in the memory 803, the shard adjustment method for a time series database provided in the method embodiment. The program code 810 may include one or more software modules. Optionally, the processor 801 may alternatively store program code or instructions for executing the solutions of this disclosure.

In a specific implementation process, the device 800 may correspond to a device configured to perform the foregoing method. The processor 801 in the device 800 reads the instructions in the memory 803, so that the device 800 shown in FIG. 8 can perform all or some of the steps in the method embodiment.

The device 800 may further correspond to the apparatus shown in FIG. 7. Each functional module in the apparatus shown in FIG. 7 is implemented by using software of the device 800. In other words, the functional modules included in the apparatus shown in FIG. 7 are generated after the processor 801 of the device 800 reads the program code 810 stored in the memory 803.

The steps of the shard adjustment method for a time series database shown in FIG. 2 are completed by using an integrated logic circuit of hardware in the processor of the device 800 or instructions in a form of software. The steps in the method embodiment disclosed may be directly performed and completed by a hardware processor, or may be performed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory, and completes the steps in the method embodiment in combination with hardware of the processor. To avoid repetition, details are not described herein again.

In an example embodiment, an embodiment provides a shard adjustment device for a time series database. The device includes a memory and a processor. The memory stores at least one instruction, and the at least one instruction is loaded and executed by the processor to enable the sharding device to implement the shard adjustment method for a time series database provided in any example embodiment.

In an example embodiment, a computer-readable storage medium is provided. The computer-readable storage medium stores at least one instruction, and the instruction is loaded and executed by a processor to implement the shard adjustment method for a time series database provided in any example embodiment.

In an example embodiment, a computer program product is provided. The computer program product includes a computer program or instructions, and the computer program or the instructions are executed by a processor to enable a computer to implement the shard adjustment method for a time series database provided in any example embodiment.

In an example embodiment, a chip is provided. The chip includes a processor configured to invoke instructions stored in a memory from the memory and run the instructions, to enable a communication device in which the chip is installed to perform the shard adjustment method for a time series database provided in any example embodiment.

In an example embodiment, another chip is provided. The chip includes an input interface, an output interface, a processor, and a memory. The input interface, the output interface, the processor, and the memory are connected through an internal connection path. The processor is configured to execute code in the memory. When the code is executed, the processor is configured to perform the shard adjustment method for a time series database provided in any example embodiment.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to this disclosure are completely or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The foregoing descriptions are merely embodiments, but are not intended to limit this disclosure. Any modification, equivalent replacement, improvement, or the like made without departing from the spirit and principle of this disclosure shall fall within the protection scope of this disclosure.

What is claimed is:

1. A method comprising:
   obtaining feature information of an access request of at least one user for a data table of a time series database, wherein the data table is divided into shard groups according to a predetermined rule, wherein each of the shard groups is divided into shards and is set in a different time period, wherein each of the shards is set in a different node, and wherein the feature information reflects an access habit of the at least one user;
adjusting the predetermined rule based on the feature information to obtain an adjusted rule; and
generating, according to the adjusted rule, a new shard group or a new shard that matches the access habit.

2. The method of claim 1, wherein generating the new shard group or the new shard comprises generating the new shard group, and wherein the method further comprises generating, in the new shard group and according to the adjusted rule, the new shard.

3. The method of claim 2, further comprising:
determining a reference moment in a predetermined shard group in which an obtaining moment of the feature information is located, wherein the reference moment is a maximum moment at which data is written into the data table before the obtaining moment of the feature information; and
determining a start moment of the new shard group based on a time interval between the reference moment and a predetermined end moment of the predetermined shard group.

4. The method of claim 3, wherein determining the start moment comprises determining, in response to the time interval being not less than a time threshold, the reference moment as the start moment, and wherein the method further comprises updating the predetermined shard group to an updated shard group having a predetermined start moment of the predetermined shard group and an updated end moment that is the reference moment.

5. The method of claim 4, wherein a new end moment of the new shard group is the predetermined end moment.

6. The method of claim 3, further comprising determining, in response to the time interval being less than a time threshold, an end moment of the predetermined shard group as the start moment.

7. The method of claim 1, wherein the feature information comprises a query fan-out degree indicating a quantity of nodes that need to be accessed to process the access request.

8. The method of claim 7, wherein adjusting the predetermined rule comprises:
determining, in response to the quantity being greater than a quantity threshold, a sharding key based on a use frequency of an access condition from the access request; and
adjusting the predetermined rule based on the sharding key to obtain the adjusted rule.

9. The method of claim 7, wherein obtaining the feature information comprises:
parsing the access request to obtain an access condition;
determining, based on the access condition, a first node that needs to be accessed to process the access request; and
determining the quantity as the query fan-out degree.

10. The method of claim 1, wherein the feature information comprises a load imbalance degree of loads of different nodes.

11. The method of claim 10, wherein adjusting the predetermined rule comprises:
determining, in response to the load imbalance degree being greater than a reference threshold, shard boundary values based on the loads; and
adjusting the predetermined rule based on the shard boundary values to obtain the adjusted rule.

12. The method of claim 10, wherein obtaining the feature information comprises:

determining the loads based on data volumes, quantities of timelines, or access frequencies of the timelines of the different nodes; and
determining the load imbalance degree based on the loads.

13. The method of claim 1, wherein the feature information comprises a correspondence between a user location and a node location, wherein the user location is of the at least one user, and wherein the node location is of a node that needs to be accessed to process the access request.

14. The method of claim 13, wherein adjusting the predetermined rule comprises:
determining, in response to a distance between the user location and the node location being greater than a distance threshold, an updated node whose distance from the user location is not greater than the distance threshold; and
adjusting the predetermined rule based on the updated node to obtain the adjusted rule.

15. The method of claim 13, wherein obtaining the feature information comprises:
parsing the access request to obtain an access condition;
determining, based on the access condition, the node to process the access request; and
determining the correspondence based on the node location and the user location.

16. The method of claim 13, wherein the feature information comprises a query fan-out degree, a load imbalance degree, and the correspondence.

17. A device comprising:
a memory configured to store at least one instruction; and
one or more processors coupled to the memory and configured to execute the at least one instruction to cause the device to:
obtain feature information of an access request of at least one user for a data table of a time series database, wherein the data table is divided into shard groups according to a predetermined rule, wherein each of the shard groups is divided into shards and is set in a different time period, wherein each of the shards is set in a different node, and wherein the feature information reflects an access habit of the at least one user;
adjust the predetermined rule based on the feature information to obtain an adjusted rule; and
generate, according to the adjusted rule, a new shard group or a new shard that matches the access habit.

18. A computer program product comprising instructions that are stored on a non-transitory computer-readable medium and that, when executed by one or more processors, cause a device to:
obtain feature information of an access request of at least one user for a data table of a time series database, wherein the data table is divided into shard groups according to a predetermined rule, wherein each of the shard groups is divided into shards and is set in a different time period, wherein each of the shards is set in a different node, and wherein the feature information reflects an access habit of the at least one user;
adjust the predetermined rule based on the feature information to obtain an adjusted rule; and
generate, according to the adjusted rule, a new shard group or a new shard that matches the access habit.

19. The computer program product of claim 18, wherein the instructions, when executed by the one or more processors, further cause the device to:
generate the new shard group or the new shard by generating the new shard group; and generate, in the new shard group and according to the adjusted rule, the new shard.

20. The computer program product of claim 18, wherein the instructions, when executed by the one or more processors, further cause the device to:
determine a reference moment in a predetermined shard group in which an obtaining moment of the feature information is located, wherein the reference moment is a maximum moment at which data is written into the data table before the obtaining moment of the feature information; and
determine a start moment of the new shard group based on a time interval between the reference moment and a predetermined moment of the predetermined shard group.

* * * * *